US008693979B2

(12) United States Patent
Cheng et al.

(10) Patent No.: US 8,693,979 B2
(45) Date of Patent: Apr. 8, 2014

(54) POWER EFFICIENT EMERGENCY CALL TRIGGERED TRACKING METHOD

(75) Inventors: Steven D. Cheng, San Diego, CA (US); Guangming Shi, San Diego, CA (US); Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/286,965

(22) Filed: Nov. 1, 2011

(65) Prior Publication Data

US 2013/0109343 A1    May 2, 2013

(51) Int. Cl.
*H04M 11/04*    (2006.01)
(52) U.S. Cl.
USPC ...................................... 455/404.2
(58) Field of Classification Search
USPC .................... 455/404.2, 574, 404.1
See application file for complete search history.

(56) References Cited

U.S. PATENT DOCUMENTS

| 6,408,172 | B1 * | 6/2002 | Alperovich et al. | 455/404.1 |
| 6,538,600 | B1 * | 3/2003 | Richton et al. | 342/357.43 |
| 2003/0125010 | A1 | 7/2003 | Jung | |
| 2007/0057767 | A1 * | 3/2007 | Sun et al. | 340/7.35 |
| 2008/0146261 | A1 | 6/2008 | Bae | |
| 2008/0153453 | A1 * | 6/2008 | Bachmutsky | 455/404.1 |
| 2009/0278738 | A1 | 11/2009 | Gopinath | |
| 2010/0124901 | A1 | 5/2010 | Shi et al. | |
| 2012/0115430 | A1 * | 5/2012 | Hawkes et al. | 455/404.1 |

FOREIGN PATENT DOCUMENTS

| EP | 1959656 A1 | 8/2008 |
| EP | 2209344 | 7/2010 |

OTHER PUBLICATIONS

Charitanetra, S et al., "Mobile positioning location using E-OTD method for GSM network", Research and Development, 2003. Scored 2003. Proceedings. Student Conference on Putrajaya, Malaysia Aug. 25-26, 2003, Piscataway, NJ, USA, IEEE, US, Aug. 25, 2003, pp. 319-324, XP010811346.
International Search Report and Written Opinion—PCT/US2012/062788—ISA/EPO—Dec. 17, 2012.
Ruutu, V. et al.. (Sep. 1998). "Mobile Phone Location in Dedicated and Idle Modes." The Ninth IEEE International Symposium on Personal, Indoor, and Mobile Radio Communications, vol. 1, pp. 456-460. doi: 10.1109/PIMRC.19981733609.

* cited by examiner

*Primary Examiner* — Temica M Beamer
*Assistant Examiner* — Joel Ajayi
(74) *Attorney, Agent, or Firm* — Tyler J. Overall

(57) ABSTRACT

Aspects of the present disclosure provide power efficient methods to track an emergency call. A mobile station may take Location Base Service (LBS) measurements during a low power state and may report the measurements to a serving base station. The serving base station may report the measurements to a network control and management system (NCMS) to track the emergency call.

31 Claims, 6 Drawing Sheets

POWER EFFICIENT EMERGENCY CALL TRIGGERED TRACKING METHOD

BACKGROUND

1. Field

Certain aspects of the present disclosure generally relate to wireless communication and, more particularly, power efficient methods for tracking a location of an emergency call.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference.

With the development of wireless communication systems, location services have been provided to determine a geographic location of a mobile station. During an emergency call, certain networks may require that such calls are handled while determining the location of the mobile station making the call. For example, in Worldwide Interoperability of Microwave Access (WiMAX) networks, it may be required that emergency phone calls are handled while their network locations need to be fully determined.

SUMMARY

In an aspect of the disclosure, a method for wireless communication is provided. The method generally includes contacting a network control and management system (NCMS) in response to receiving an emergency call placed by a mobile station (MS), placing the MS in a low power state, receiving measurements related to a location of the MS taken during one or more unavailable intervals of the low power state, and reporting the measurements to the NCMS.

In an aspect of the disclosure, an apparatus for wireless communication is provided. The apparatus generally includes means for contacting a network control and management system (NCMS) in response to receiving an emergency call placed by a mobile station (MS), means for placing the MS in a low power state, means for receiving measurements related to a location of the MS taken during one or more unavailable intervals of the low power state, and means for reporting the measurements to the NCMS.

In an aspect of the disclosure, an apparatus for wireless communication is provided. The apparatus generally includes at least one processor and a memory coupled to the at least one processor. The at least one processor is generally configured to contact a network control and management system (NCMS) in response to receiving an emergency call placed by a mobile station (MS), place the MS in a low power state, receive measurements related to a location of the MS taken during one or more unavailable intervals of the low power state, and report the measurements to the NCMS.

In an aspect of the disclosure, a computer-program product for wireless communication is provided. The computer-program product generally includes a non-transitory computer-readable medium having code stored thereon. The code is generally executable by one or more processors for contacting a network control and management system (NCMS) in response to receiving an emergency call placed by a mobile station (MS), placing the MS in a low power state, receiving measurements related to a location of the MS taken during one or more unavailable intervals of the low power state, and reporting the measurements to the NCMS.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
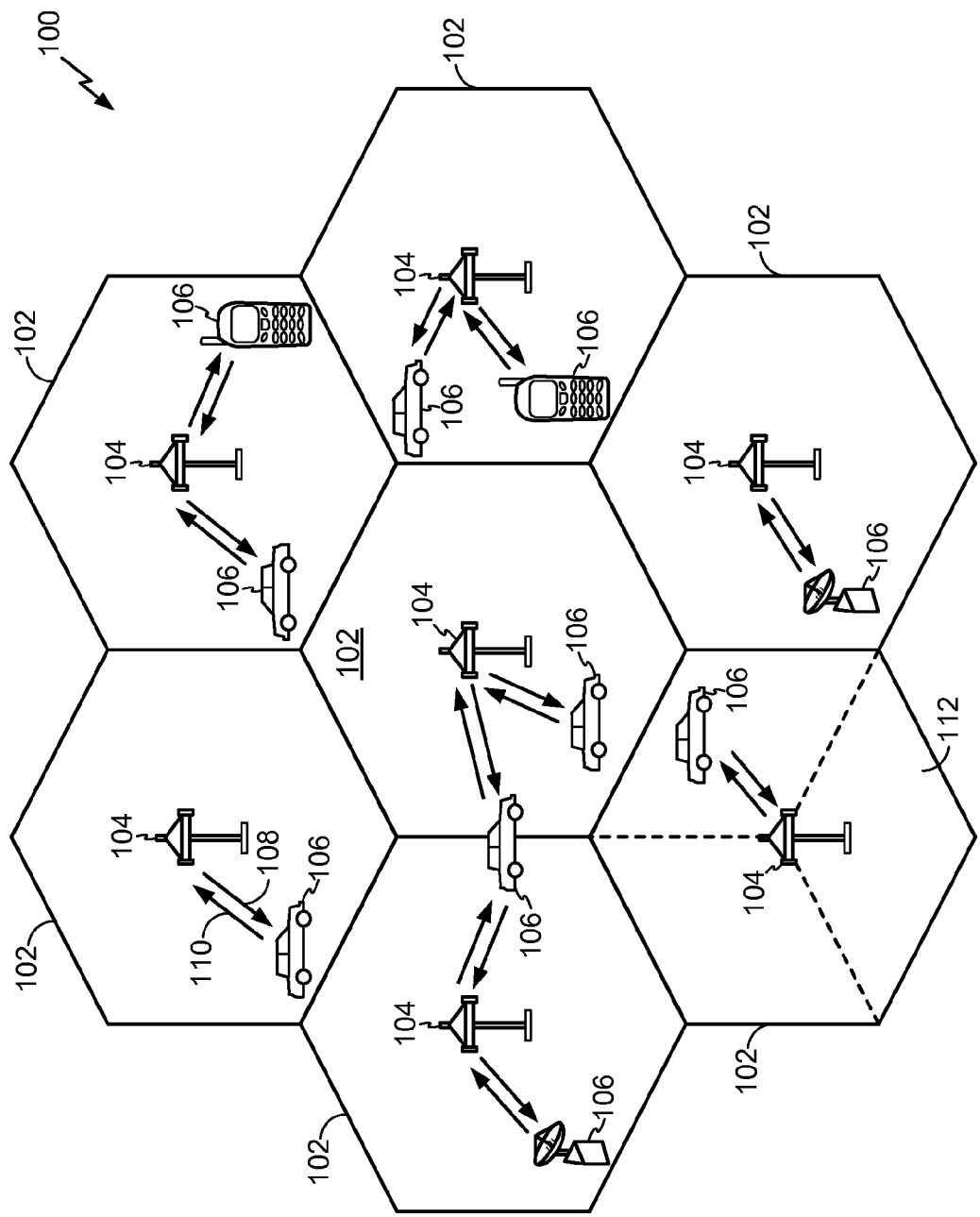
FIG. 1 illustrates an example wireless communication system, in accordance with certain aspects of the present disclosure.

Certain aspects of the present disclosure provide power efficient methods for tracking a location of an emergency call. According to aspects, an emergency call may trigger a tracking method at a network control and management system (NCMS).

An Example Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 Oct. 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

As those skilled in the art will readily appreciate from the detailed description to follow, the various concepts presented herein are well suited for WiMAX applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), LTE, IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
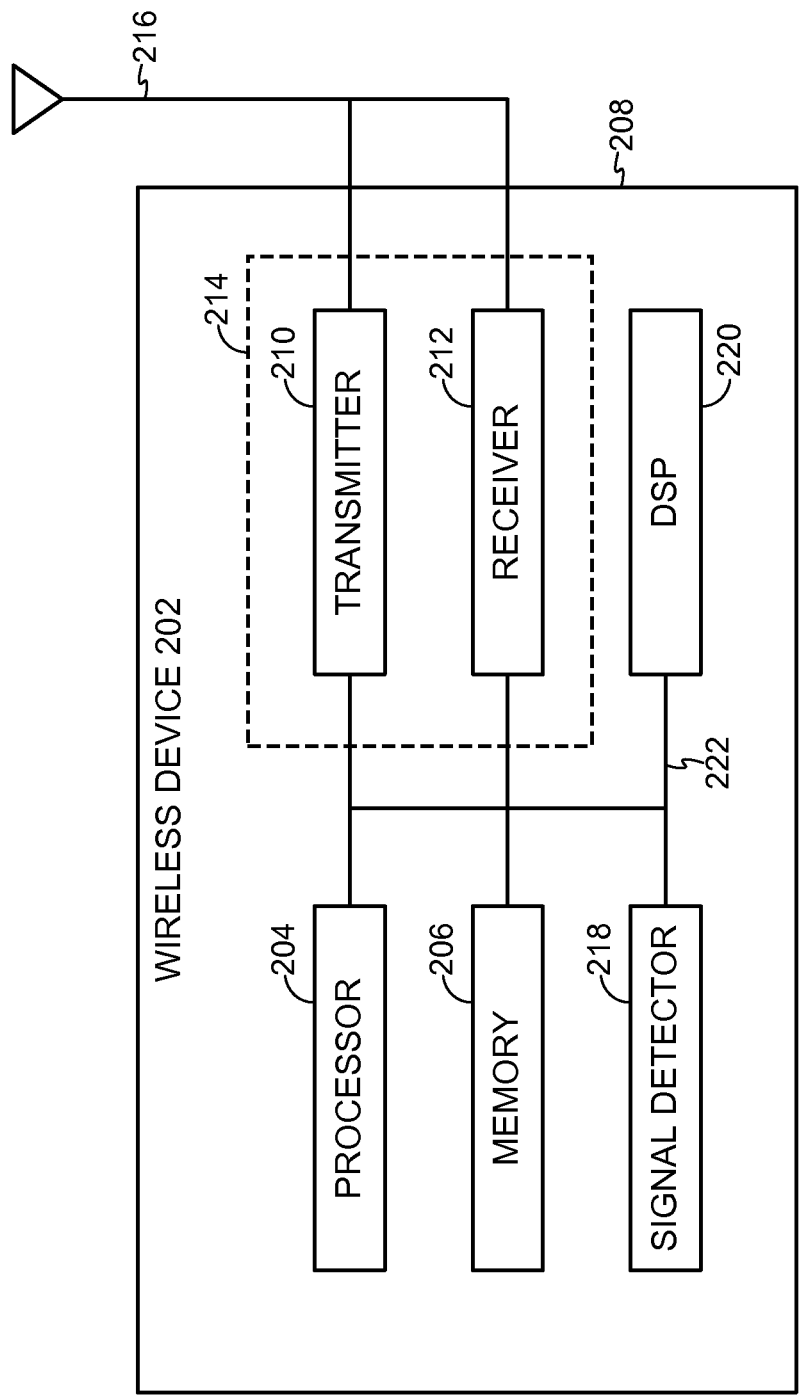
FIG. 2 illustrates various components that may be utilized in a wireless device, in accordance with certain aspects of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
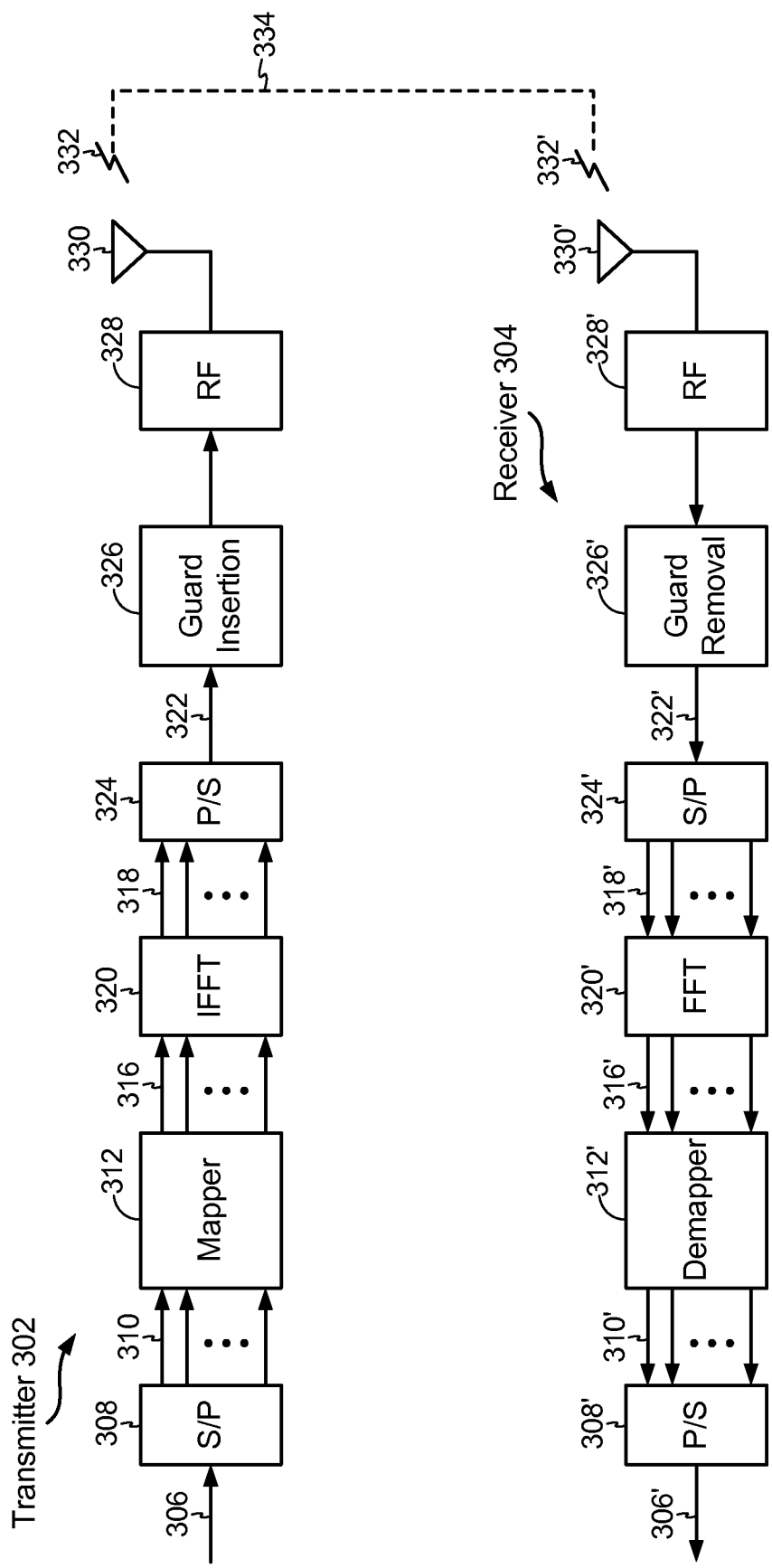
FIG. 3 illustrates an example transmitter and an example receiver that may be used within a wireless communication system that utilizes orthogonal frequency-division multiplexing and orthogonal frequency division multiple access (OFDM/OFDMA) technology, in accordance with certain aspects of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Power Efficient Emergency Call Triggered Tracking

Aspects of the present disclosure provide techniques to enhance emergency call related tracking features. The techniques may be performed, for example, by a base station, in response to receiving an emergency call.

According to some standards, an emergency call center should be able to track a geographic location of a MS making an emergency call. Mobile stations may periodically report their geographic location information to the emergency center via their serving base station. A power efficient tracking method may enhance emergency call related features and may be desirable, especially during long tracking periods.

Upon receiving an emergency call, a serving BS may contact the network control and management system (NCMS) to activate an emergency call service and tracking features in WiMAX. According to aspects of the present disclosure, a serving BS may instruct the MS to perform measurements related to its location during an unavailable interval. For example, the serving BS may configure the MS to perform periodic measurements related to its location during unavailable intervals of a low power state. The MS may report the measurements when the connections are available.

Figure 4:
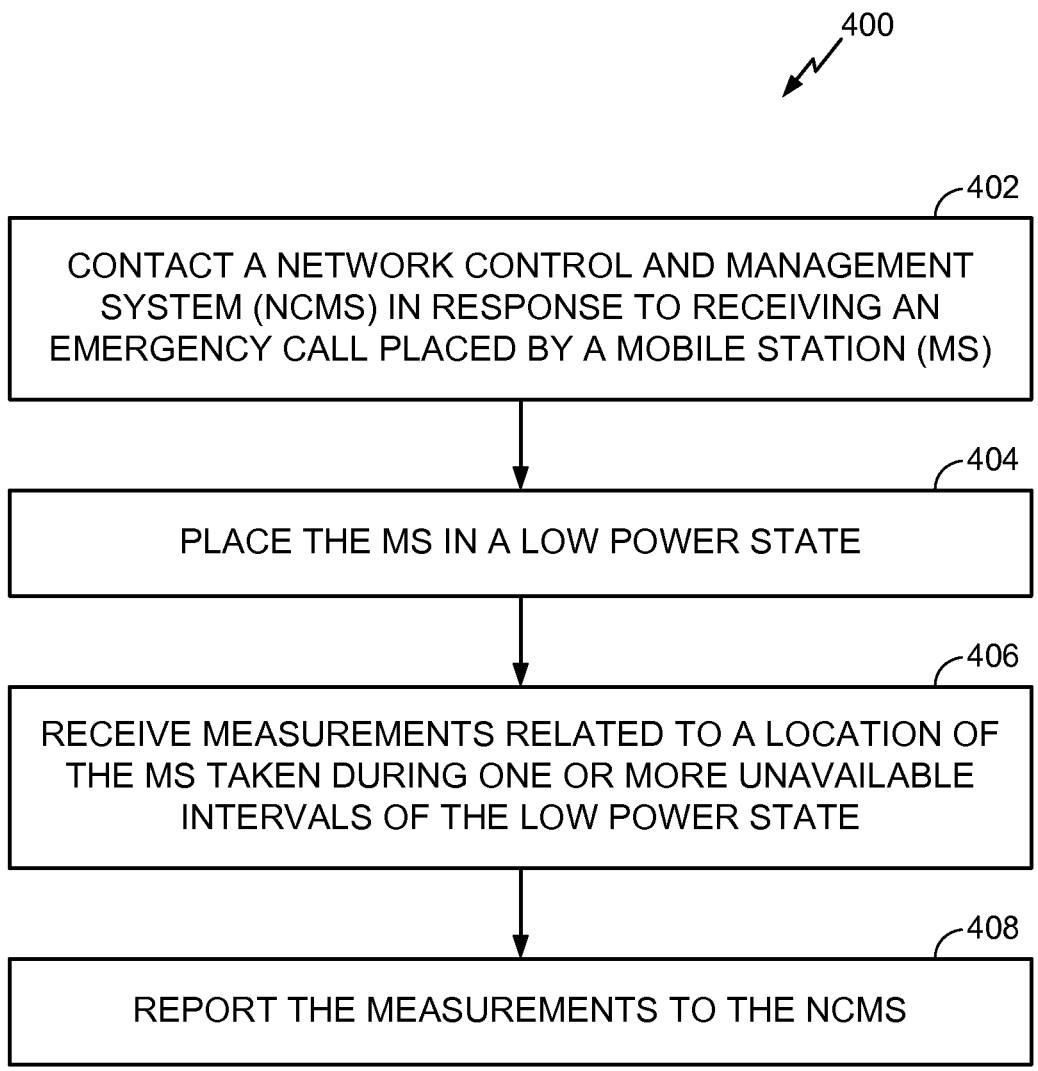
FIG. 4 illustrates example operations which may be performed, for example, by a base station, in accordance with certain aspects of the present disclosure.

FIG. 4 illustrates example operations 400 which may be performed, for example, by a serving BS, to trigger a power efficient tracking method in response to receiving an emergency call.

At 402, the BS may contact a NCMS in response to receiving an emergency call placed by a MS. At 404, the BS may place the MS in a low power state. According to aspects, the low power state may be an idle mode or a sleep mode. At 406, the BS may receive measurements related to a location of the MS taken during one or more unavailable intervals of the low power state. At 408, the BS may report the measurements to the NCMS.

As will be described in more detail below, the emergency call may be connected to a location base service (LBS) using an idle mode, a sleep mode, or a hybrid approach using both the idle mode and the sleep mode approach. According to aspects, a MS may transmit reports regarding its location to its serving BS during an available interval. The reports may include, for example, MS-initiated neighbor cell measurements, downlink time difference of arrival (D-TDOA) measurements, global positioning system (GPS) location information, or uplink time difference of arrival (U-TDOA) measurements.

Figure 5:
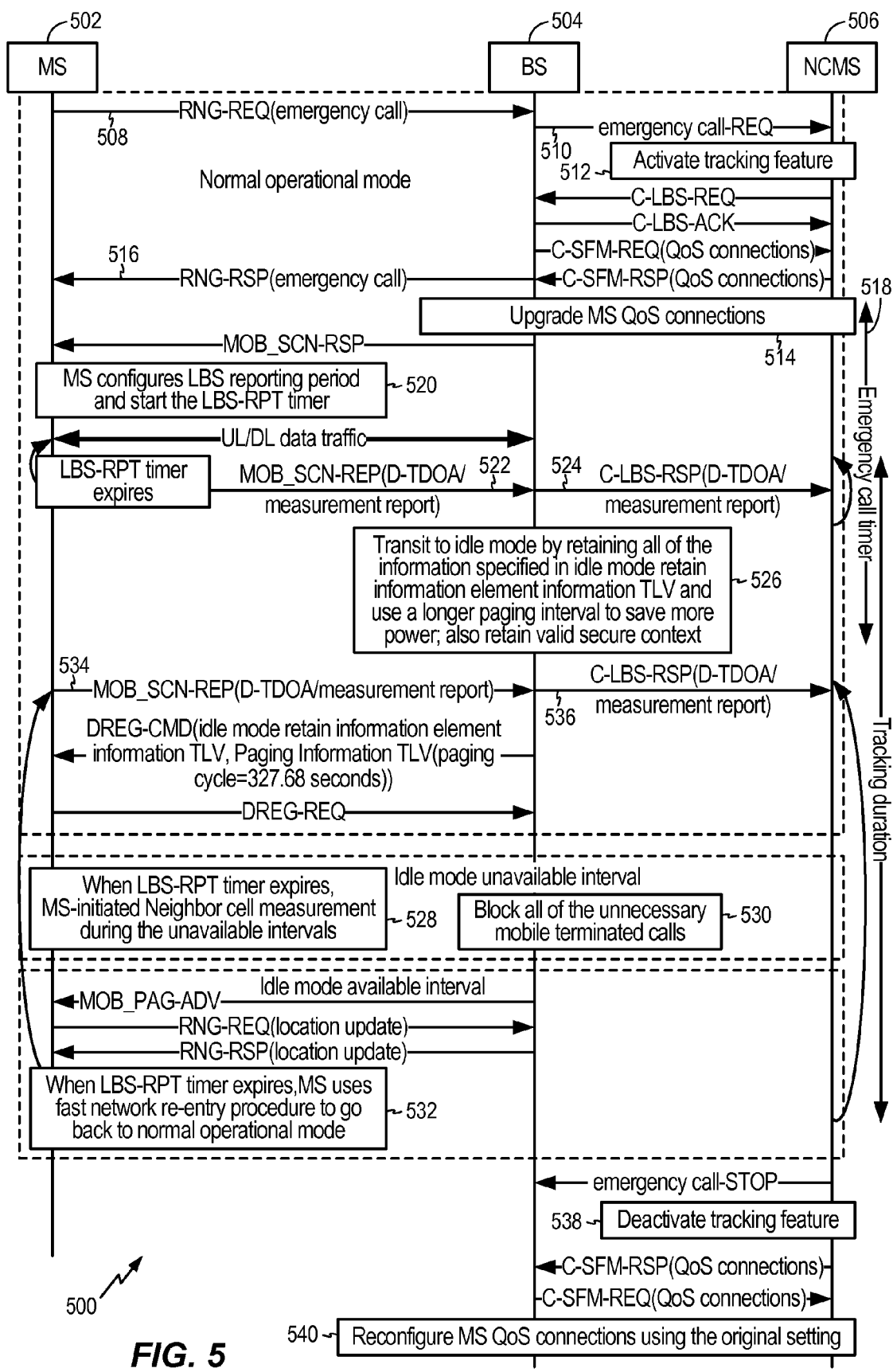
FIG. 5 illustrates an example emergency call triggered tracking protocol using an idle mode, in accordance with certain aspects of the present disclosure.

FIG. 5 illustrates an example power efficient, emergency call triggered tracking method 500 using an idle mode, according to aspects of the present disclosure.

During a normal operation mode, a MS 502 may make an emergency call at 508. Upon receiving the emergency call, the serving BS 504 may contact a NCMS 506. For example, at 510, the BS 504 may transmit the emergency call request to the NCMS 506. Passing the emergency call request to the NCMS 506 may activate a tracking feature 512 which may cause the NCMS 506 to track the geographic location of the MS 502.

According to some standards, an LBS interface may exist between the serving BS 504 and the NCMS 506. The BS 504 may confirm the emergency call by transmitting, at 516, a RNG-RSP to the MS 502 and starting an emergency call timer 518. In an effort to efficiently track the location of a user during an emergency call, the interface between the BS 504 and NCMS 506 may upgrade the quality of service (QoS) 514 of the mobile station's data connections. Upgrading the QoS of the data connections may allow the MS 502 to spend less time to complete current activities and report location information to the BS 504.

At 520, after the MS 502 receives the MOB_SCN-RSP from the BS 504, it may configure a periodic LBS reporting period and start an LBS reporting timer for reporting location information to the BS 504. For example, the BS 504 may configure the MS 502 with a periodic timer for taking location related measurements. When the LBS timer expires, the MS 502 may transmit information related to its location to the BS 504 via a scanning report (MOB_SCN-REP) 522.

The scanning report, received by the BS 504, may include location information using any LBS method available to the MS 502, including D-TDOA measurement reports, GPS location information, and U-TDOA measurement reports. Upon receiving location information of the MS 502 through the scanning report, at 524, the BS 504 may use the LBS interface to transmit attributes related to the scanning report to the NCMS 506.

When the emergency call timer 518 expires, the MS 502 may be instructed to enter a low power state and may configure its location information reporting period. Thus, at 526, the MS may transit to an idle mode. The BS 504 may configure the idle mode paging cycle to a maximum idle mode paging cycle. Configuring the MS 502 with an idle mode paging cycle to a maximum paging cycle may reduce power consumption at the MS 502 during a tracking interval. According to aspects, the BS 504 may configure the idle mode interval to a large value, for example up to 65,536 frames, to save power.

During the idle mode, the BS 504 may retain one or more settings as specified in an idle mode retain information element. For example, the BS 504 may retain all settings, which may allow the MS 502 to use fast network re-entry procedures to connect back to the normal operational mode and report the LBS related information taken during an unavailable interval in a periodic manner.

When the LBS reporting timer expires, at 528, during an unavailable interval of the idle mode, the MS 502 may perform MS-initiated neighbor cell measurements. At 530, the BS 504 may block all mobile terminated incoming calls, except calls from the emergency call center in an effort to save power at the MS 502. According to aspects, a user may be able to review missed calls through related missing call services associated with the MS 502.

During the idle mode available interval, the MS 502 and the BS 504 may perform ranging procedures. When the LBS reporting timer expires during the idle mode available interval, the MS may, at 532, use fast network re-entry procedures to return to the normal operational mode.

At 534, the MS 502 may transmit a scanning report with location information of the MS. According to aspects, the scanning report may contain MS-initiated neighbor cell measurements. The BS 504 may transmit information related to the scanning report to the NCMS 506 at 536.

Once the BS 504 receives the scanning report, the MS may repeat the idle mode power saving procedure. If downlink data requests exist, according to aspects, the BS 504 may instruct the MS 502 to enter the sleep mode, which will be described in more detail below with reference to FIG. 6.

The tracking feature may be deactivated, at 538, once the tracking request is complete. At 540 the QoS of the mobile station's data connections may be updated to original settings.

Figure 6:
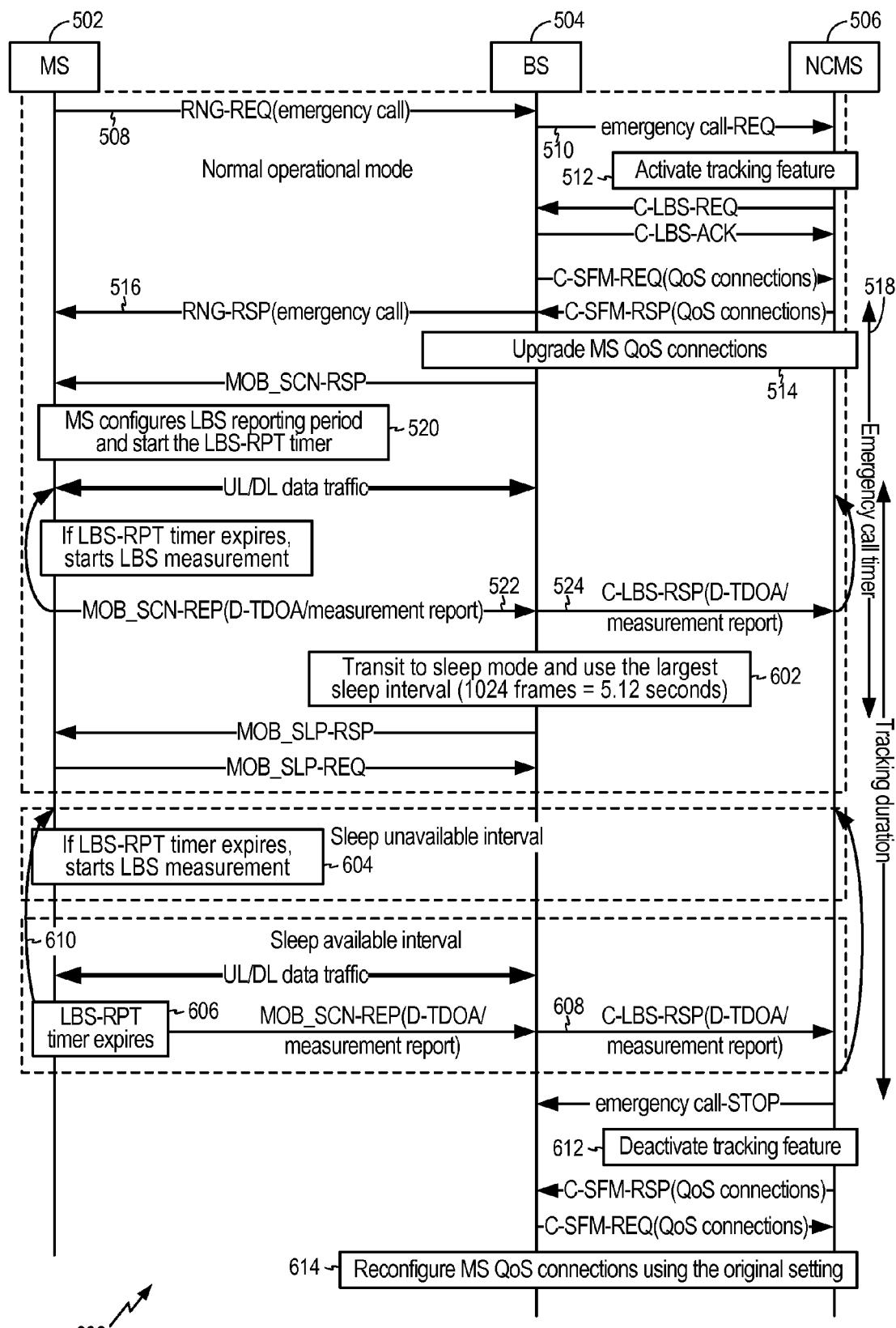
FIG. 6 illustrates an example emergency call triggered tracking protocol using a sleep mode, in accordance with certain aspects of the present disclosure.

FIG. 6 illustrates an example power efficient, emergency call triggered tracking method 600 using a sleep mode, according to aspects of the present disclosure.

Similar to the idle mode approach illustrated in FIG. 5, during a normal operation mode, a base station 504 may contact a NCMS 506 in response to receiving an emergency call 508. At 510, the BS 504 may pass the emergency call to the NCMS 506. Transmitting the emergency call request to the NCMS 506 may activate a tracking feature 512 which may cause the NCMS 506 to track the geographic location of the emergency call.

At 516, the BS 504 may confirm the emergency call by transmitting a RNG-RSP to the MS 502 and starting an emergency call timer 518. The interface between the BS 504 and NCMS 506 may upgrade the quality of service (QoS) 514 of the mobile station's data connections to allow the MS 502 to spend less time to complete current activities and report location information to the BS 504.

At 520, the MS 502 may configure its LBS reporting period and may start an LBS reporting timer. When the LBS timer expires, the MS 502 may start to collect LBS related information. At 522, the MS may transmit collected information related to its location to the BS 504 via a scanning report (MOB_SCN-REP). The scanning report may include D-TDOA measurement or any other measurements supported by the mobile station's LBS methods. Upon receiving location information of the MS 502 through the scanning report, the BS 504 may use the LBS interface to transmit attributes related to the scanning report to the NCMS 506 at 524.

When the emergency call timer 518 expires, the MS 502 may be instructed to enter a low power state and may configure its location information reporting period. Thus, at 602, the MS may transit to a sleep mode. The BS 504 may configure sleep mode unavailable cycles to a maximum period in an effort to reduce power consumption at the MS 502. For example, the sleep mode may be configured to a maximum sleep mode unavailable interval. According to aspects, the sleep interval may be configured to a value up to, for example, 1024 frames in an effort to achieve maximum power saving provided by sleep mode features.

When the periodic LBS reporting timer expires during the sleep mode unavailable interval, the MS 502 may use a small portion of the unavailable interval to perform LBS related measurements. The MS 502 may transmit information related to the measurements during an available interval.

For example, when the LBS reporting timer expires, at 604, the MS 502 may begin LBS measurements. The measurements may include measurements from any LBS method used by a MS, and may include D-TDOA measurements, GPS location information, and U-TDOA measurements.

When the LBS reporting timer expires during a sleep mode available interval, at 606, the MS 502 may transmit a scanning report regarding its location information to the BS 504. The BS 504 may report this information to the NCMS 506 at 608.

After the MS 502 transmits the scanning report during the sleep mode available interval, the MS may, at 610, enter the sleep mode unavailable interval and repeat the measuring and reporting procedure until the tracking request is complete.

The tracking feature may be deactivated, at 612, after the emergency call triggered tracking request is complete. The QoS of the mobile station's data connections may be updated to original settings at 614.

In addition to idle mode and sleep mode emergency call triggered methods, according to aspects, a hybrid power efficient tracking method may be used to track an emergency call. If no uplink or downlink traffic exists, the MS may perform tracking procedures using the idle mode, for example, as described with reference to FIG. 5. Otherwise, the MS may perform tracking procedures using the sleep mode, for example, as described with reference to FIG. 6. According to aspects, the LBS reporting schedule may include multiple paging cycles or sleep intervals in an effort to reduce power consumption while tracking the emergency call.

Thus, aspects described herein provide methods to reduce power consumption at a MS while tracking the location of an emergency call. In response to receiving a call, a BS may upgrade the QoS priority of the MS connections in an effort to allow the MS to spend less time to complete current data services and report location information. The BS may instruct the MS to enter a low power state through a sleep mode, an idle mode, or a hybrid mode approach.

According to aspects, the MS may perform location related measurements during a low power state and may periodically report LBS information to the BS during an available interval. The NCMS may be able to track the location of the MS by receiving information related to the location of the MS from the serving BS. When the emergency call is complete, the NCMS may inform the BS to reset the QoS priority of data connections of the MS to the original settings.

Aspects described herein provide a system level approach to integrate the emergency call with the LBS features in a power efficient manner. The tracking mode triggered by the emergency call may provide more precise location information through the LBS features and may allow mobile devices to be tracked for long periods of time.

While techniques have been described with reference to particular examples involving a WiMAX network, those skilled in the art will recognize that the techniques presented herein may be more generally applied to more efficiently track an emergency call in a power efficient matter.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by various hardware and/or software component (s) and/or module(s) corresponding to means-plus-function blocks illustrated in the Figures. More generally, where there are methods illustrated in Figures having corresponding counterpart means-plus-function Figures, the operation blocks correspond to means-plus-function blocks with similar numbering.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, comprising:
   contacting a network control and management system (NCMS) in response to receiving an emergency call placed by a mobile station (MS);
   connecting the emergency call of the MS to an emergency call center;
   placing the MS in a low power state;
   updating a quality of service (QoS) of a connection with the MS in response to receiving the emergency call placed by the MS;
   determining whether an incoming call to the MS originates from the emergency call center;
   blocking the incoming call to the MS when it is determined that the incoming call does not originate from the emergency call center;
   allowing the incoming call to reach the MS when it is determined that the incoming call originates from the emergency call center;
   receiving measurements related to a location of the MS taken during one or more unavailable intervals of the low power state; and
   reporting the measurements to the NCMS.

2. The method of claim 1, wherein contacting the NCMS comprises:
   transmitting an emergency call request that causes the NCMS to track the MS.

3. The method of claim 1, wherein receiving measurements related to the location of the MS comprises:
   receiving MS-initiated neighbor cell measurements.

4. The method of claim 1, wherein receiving measurements related to the location of the MS comprises:
   receiving location information of the MS through a scanning report (MOB_SCN-REP).

5. The method of claim 4, wherein the scanning report comprises a downlink time difference of arrival (D-TDOA) measurement report.

6. The method of claim 1, wherein the low power state comprises an idle mode.

7. The method of claim 6, wherein placing the MS in the low power state comprises:
   configuring the MS with a maximum idle mode paging cycle.

8. The method of claim 1, wherein the low power state comprises a sleep mode.

9. The method of claim 8, wherein placing the MS in the low power state comprises:
   configuring the MS with a maximum sleep mode unavailable interval.

10. The method of claim 1, further comprising:
    configuring the MS with a periodic timer for taking the measurements related to the location of the MS.

11. An apparatus for wireless communication, comprising:
    means for contacting a network control and management system (NCMS) in response to receiving an emergency call placed by a mobile station (MS);
    means for connecting the emergency call of the MS to an emergency call center;
    means for placing the MS in a low power state;
    means for updating a quality of service (QoS) of a connection with the MS in response to receiving the emergency call placed by the MS;
    means for determining whether an incoming call to the MS originates from the emergency call center;
    means for blocking the incoming call to the MS when it is determined that the incoming call does not originate from the emergency call center;
    means for allowing the incoming call to reach the MS when it is determined that the incoming call originates from the emergency call center;
    means for receiving measurements related to a location of the MS taken during one or more unavailable intervals of the low power state; and
    means for reporting the measurements to the NCMS.

12. The apparatus of claim 11, wherein the means for contacting the NCMS comprises:
 means for transmitting an emergency call request that causes the NCMS to track the MS.

13. The apparatus of claim 11, wherein the means for receiving measurements related to the location of the MS comprises:
 means for receiving MS-initiated neighbor cell measurements.

14. The apparatus of claim 11, wherein the means for receiving measurements related to the location of the MS comprises:
 means for receiving location information of the MS through a scanning report (MOB_SCN-REP).

15. The apparatus of claim 14, wherein the scanning report comprises a downlink time difference of arrival (D-TDOA) measurement report.

16. The apparatus of claim 11, wherein the low power state comprises an idle mode.

17. The apparatus of claim 16, wherein the means for placing the MS in the low power state comprises:
 means for configuring the MS with a maximum idle mode paging cycle.

18. The apparatus of claim 11, wherein the low power state comprises a sleep mode.

19. The apparatus of claim 18, wherein the means for placing the MS in the low power state comprises:
 means for configuring the MS with a maximum sleep mode unavailable interval.

20. The apparatus of claim 11, further comprising:
 means for configuring the MS with a periodic timer for taking the measurements related to the location of the MS.

21. An apparatus for wireless communication, comprising:
 at least one processor configured to:
  contact a network control and management system (NCMS) in response to receiving an emergency call placed by a mobile station (MS);
  connect the emergency call of the MS to an emergency call center;
  place the MS in a low power state;
  update a quality of service (QoS) of a connection with the MS in response to receiving the emergency call placed by the MS;
  determine whether an incoming call to the MS originates from the emergency call center;
  block the incoming call to the MS when it is determined that the incoming call does not originate from the emergency call center;
  allow the incoming call to reach the MS when it is determined that the incoming call originates from the emergency call center;
  receive measurements related to a location of the MS taken during one or more unavailable intervals of the low power state; and
  report the measurements to the NCMS; and
 a memory coupled to the at least one processor.

22. The apparatus of claim 21, wherein the at least one processor is configured to contact the NCMS by:
 transmitting an emergency call request that causes the NCMS to track the MS.

23. The apparatus of claim 21, wherein the at least one processor is configured to receive measurements related to the location of the MS by:
 receiving MS-initiated neighbor cell measurements.

24. The apparatus of claim 21, wherein the at least one processor is configured to receive measurements related to the location of the MS by:
 receiving location information of the MS through a scanning report (MOB_SCN-REP).

25. The apparatus of claim 24, wherein the scanning report comprises a downlink time difference of arrival (D-TDOA) measurement report.

26. The apparatus of claim 21, wherein the low power state comprises an idle mode.

27. The apparatus of claim 26, wherein the at least one processor is configured to place the MS in the low power state by:
 configuring the MS with a maximum idle mode paging cycle.

28. The apparatus of claim 21, wherein the low power state comprises a sleep mode.

29. The apparatus of claim 28, wherein the at least one processor is configured to place the MS in the low power state by:
 configuring the MS with a maximum sleep mode unavailable interval.

30. The apparatus of claim 21, wherein the at least one processor is further configured to:
 configure the MS with a periodic timer for taking the measurements related to the location of the MS.

31. A computer-program product for wireless communication, the computer-program product comprising a non-transitory computer-readable medium having code stored thereon, the code executable by one or more processors for:
 contacting a network control and management system (NCMS) in response to receiving an emergency call placed by a mobile station (MS);
 connecting the emergency call of the MS to an emergency call center;
 placing the MS in a low power state;
 updating a quality of service (QoS) of a connection with the MS in response to receiving the emergency call placed by the MS;
 determining whether an incoming call to the MS originates from the emergency call center;
 blocking the incoming call to the MS when it is determined that the incoming call does not originate from the emergency call center;
 allowing the incoming call to reach the MS when it is determined that the incoming call originates from the emergency call center;
 receiving measurements related to a location of the MS taken during one or more unavailable intervals of the low power state; and
 reporting the measurements to the NCMS.

* * * * *